United States Patent [19]
Van Horne

[11] Patent Number: 5,569,420
[45] Date of Patent: Oct. 29, 1996

[54] METHOD OF FORMING A FOAM CORE COMPRISING A PLURALITY OF ARCUATE ROWS

[76] Inventor: Bret L. Van Horne, 25252 Orellano Way, Laguna Hills, Calif. 92653

[21] Appl. No.: 384,138

[22] Filed: Feb. 6, 1995

[51] Int. Cl.⁶ .............................. B29C 44/06; B29C 44/08
[52] U.S. Cl. ...................... 264/46.4; 264/45.1; 264/46.4; 264/51; 156/79
[58] Field of Search .................. 264/45.1, 46.4, 264/46.6, 51; 156/79

[56] References Cited

U.S. PATENT DOCUMENTS

| | | | |
|---|---|---|---|
| 3,514,798 | 6/1970 | Ellis | 441/74 |
| 3,543,315 | 12/1970 | Hoffman | 441/74 |
| 3,657,036 | 4/1972 | Mullenhoff et al. | 156/79 |
| 4,073,839 | 2/1978 | Burkholder et al. | 264/45.1 |
| 4,405,681 | 9/1983 | McEvoy | 264/46.4 |
| 4,713,032 | 12/1987 | Frank | 441/74 |
| 4,714,574 | 12/1987 | Tenhagen | 264/45.1 |
| 4,726,086 | 2/1988 | McEvoy | 264/45.1 |
| 4,753,836 | 6/1988 | Mizell | 428/71 |
| 4,762,654 | 8/1988 | Fuchigami et al. | 264/45.1 |
| 4,797,312 | 1/1989 | Sherwood | 428/117 |
| 4,961,715 | 10/1990 | Shanelec | 441/74 |
| 5,023,042 | 6/1991 | Efferding | 264/511 |
| 5,234,638 | 8/1993 | Jang | 264/45.4 |

*Primary Examiner*—Allan R. Kuhns
*Attorney, Agent, or Firm*—John W. Carpenter

[57] ABSTRACT

A foam having an internal structure comprising vertical walls, formed by curing individual rows of foam and subsequently layering multiple rows of foam to produce a billet or core is shown for use in the core of a structure where improved resistance to compression is desired, such as in the core of a surfboard, sailboard, or the like.

11 Claims, 5 Drawing Sheets

METHOD OF FORMING A FOAM CORE COMPRISING A PLURALITY OF ARCUATE ROWS

FIELD OF THE INVENTION

The present invention is generally related to a foam composition of matter and a method for producing same. More specifically, the present invention is related to a foam composition of matter having an internal structure defining vertical walls, and a method for producing same. The present invention is further related to a core material for a surfboard.

BACKGROUND OF THE INVENTION

This invention relates to the formation and construction of foam-core materials, such as may be used in the construction of such diverse items as surfboards, sailboards, home built and/or light aircraft, or any other product with a laminated foam core. A typical method of forming a surfboard uses fiberglass or other fiber-reinforced plastic laminated over a foam-core. A rigid polyester-urethane foam is carved and sanded to the desired shape, and a hard shell of fiberglass-reinforced polyester-resin is laminated over the core. Various end uses of the boards (e.g. amateur vs. professional) require varying properties of the boards, effected by the materials used in the construction. The foam core can be made from low-density urethane, styrene, or PVC foam, with any suitable laminating material such as polyester or epoxy resin with carbon, kevlar, or glass fibers.

One of the limiting factors in producing a light, yet strong, board is the strength-to-density ratio of the foam core. Although the rigid foams used in surfboards are relatively strong for their density, there are two problems that arise in the manufacture of such boards:

1. Spars (or 'stringers') are usually placed longitudinally through the core of the board, to carry the compressive and shear loads of the board during bending, because the foam core alone cannot sustain the loads; and
2. Extra laminations are usually required on the deck of the boards where the feet of the rider contact the deck, because the foam core tends to fail when in compression beneath the fiberglass shell, leading to dents, delamination of fiberglass from foam, fractures in the fiberglass, and, finally, the structural degradation of the board.

The above problems add to the cost and time of fabrication of such boards. Further, such boards are typically undesirably heavier. The need for additional laminations and spars can be reduced or eliminated by increasing the strength of the foam core, particularly in resistance to compression in a vertical direction.

The above problems can be markedly reduced or eliminated by the method of the present invention. A foam or foam core having a cellular structure, such as half circular or honeycomb, inherently formed in the foam is produced by mixing a foamable plastic, such as two-part urethane foam system or any other system for producing a plastic foam such as P.V.C., placing beads or rows expressed from the foamable plastic side-by-side, curing the rows, placing another layer of side-by-side foam rows over the first layer, curing the second layer, repeating this process (i.e., to achieve as many additional rows as desired) to form a billet or board of cured foam, and cutting the billet vertically and trimming the resultant sections.

A patentability search was conducted and the following U.S. Patents were found: U.S. Pat. No. 3,514,798 to Ellis; U.S. Pat. No. 3,543,315 to Hoffman; U.S. Pat. No. 4,713,032 to Frank; U.S. Pat. No. 4,753,836 to Mizell; U.S. Pat. No. 4,797,312 to Sherwood; U.S. Pat. No. 4,961,715 to Shanelec; U.S. Pat. No. 5,023,042 to Efferding; and U.S. Pat. No. 5,234,638 to Jang.

The U.S. Pat. No. 3,514,798 to Ellis teaches a method of constructing a lighter surfboard comprising a surfboard in which the outer shell or skin is composed of solidified laminating polyester resin onto which, while the resin is still moist, is pressed a sheet of glass cloth which is then impregnated with the same resin. This occurs on the interior surface of each half of a mold having the configuration of the surf-board when mold is closed and onto this moist shell is pressed and secured thereto by adhesion a sheet of honeycomb material such as kraft liner board impregnated with a thermosetting phenolic resin.

The U.S. Pat. No. 3,543,315 to Hoffman teaches surfboard fabrication providing increased safety insofar as the usual hard surfacing thereof is virtually eliminated. Specifically, a surfboard is fabricated with a low density core contoured to the required depth and carrying spaced stress members, and over which a skin of depressible material is carried for supporting engagement of a person's body parts, for example.

The U.S. Pat. No. 4,713,032 to Frank teaches a method of making a sailboard or surfboard, in which a prefabricated foam core has fibrous material wound about it and a polyurethane resin especially set with a reaction retarder is poured onto the fibrous material, whereupon the thus treated foam core is inserted in a molding tool and the mold is closed for curing the polyurethane resin.

The U.S. Pat. No. 4,753,836 to Mizell teaches a lightweight resin/glass fiber covered article such as a surfboard. A portion of the upper surface of the article has the ability to withstand exterior surface pressure applied on a small area without damage to the surface thereof. The article has a rigid foam core to which a resilient foam cushion is adhered over which a thin rigid foam sheet is applied and the entire article is coated with a resin and glass fiber layer. The method of making the article is also disclosed.

The U.S. Pat. No. 4,797,312 to Sherwood teaches a surface-reinforced lightweight article, which includes a honeycomb structure whose sidewalls are reinforced by an expanded foam. The article can be manufactured by laying a fibrous third layer, such as several layers of dry tissue paper backed by a layer of dry fiberglass cloth, on the walls of a mold, laying a second layer of multi-cell honeycomb-like material against the third layer, and laying a finely porous first layer such as tissue paper over the second layer. Foamable plastic is poured in the mold over the three layers into a tight sandwich and permeates the layers to reinforce them. Specifically, expanded foam in the cells of multi-cell honeycomb type material braces the honeycomb sidewalls against collapse, to greatly increase the strength and rigidness of the article.

The U.S. Pat. No. 4,961,715 to Shanelec teaches surfboards and the like formed of molded foam composed of expanded polypropylene foam beads, having a density of approximately 3.75 PCF, melted together with steam pressure.

The U.S. Pat. No. 5,023,042 to Efferding teaches that sailboards having a tucked rail are made from a flexible resilient mold so that the seam of the board is along its bottom edges instead of at its point of greatest breadth. A flexible mold part having the contour of the sailboard to be produced has an opening smaller than the greatest breadth of the board. The mold is first flexed so that its opening is sufficiently wide to receive the blank that forms the body of the sailboard. Secondly, the blank is inserted into the flexed mold, and thirdly, the mold is released and its resiliency returns it to its original shape. A conventional rigid mold part closes the open end, and a vacuum is applied to form the final product. The flexible mold part is flexed a second time to remove the product.

The U.S. Pat. No. 5,234,638 to Jang teaches a surfboard making process including the steps of preparing a polyethylene bag to hold a foamed EPS (expanded polystyrene), treating the polyethylene bag with the foamed EPS through a secondary foaming process, and putting the product thus obtained from the secondary foaming process in the molding cavity of a molding die for treating into a surfboard by a steam bath.

None of the foregoing teach the particular foam or method for producing same of the present invention.

SUMMARY OF THE INVENTION

The present invention broadly accomplishes its desired objects by providing a method of producing a plastic foam composition of matter which may be used in the core of a surfboard or a sailboard. The plastic foam composition has an improved strength-to-density ratio from manufacturing the plastic foam composition of matter in such a manner that cellular walls are formed in the plastic foam composition of matter itself. The method preferably comprises the steps of: preparing a first liquid plastic mixture that is capable of foaming to produce a plastic foam composition of matter; depositing on a generally planar surface the first liquid plastic mixture in a form of a first row having essentially an arcuate top; curing the first row of the first liquid plastic mixture of step to produce a first row of foamed plastic having a first arcuate shell; preparing a second liquid plastic mixture that is capable of foaming to produce a plastic foam composition of matter; depositing on the generally planar surface the second liquid plastic mixture in a form of a second row juxtaposed to and contiguous and/or generally in contact with the first arcuate shell; curing the second row of the second liquid plastic mixture to produce a second row of foamed plastic that is generally bound to the first row and comprises a second arcuate shell that terminates in the first arcuate shell to form a first trough between the first arcuate shell and the second arcuate shell; preparing a third liquid plastic mixture that is capable of foaming to produce a plastic foam composition of matter; depositing on the first trough the third liquid plastic mixture in a form of a third row in contact with the first arcuate shell and the second arcuate shell; curing the third liquid plastic mixture to produce a third row of foamed plastic that is bound to the first row and to the second row and comprises a third arcuate shell. The method further comprises having the second arcuate shell generally terminating in the first arcuate shell and the third arcuate shell terminating in the second arcuate shell and such that a vertical sectional view through said plastic foam composition of matter defines each of the first, second, and third arcuate shells as being convex. The method is repeated to form a billet of the plastic composition of matter comprising multiple rows and multiple layers.

It is further an object of the present invention to provide a plastic composition of matter comprising a first foam core defined by a first hardened arcuate shell of the same material as the first foam core. A second foam core, defined by a second hardened arcuate shell of the same material as the first foam core, is generally contiguous or in contact with the first foam core and a channel or trough is defined between the first foam core and the second foam core. A third foam core is defined by a third hardened arcuate shell terminating in the first arcuate shell and the second arcuate shell.

It is further an object of the present invention to provide a plastic foam composition of matter having improved strength to density ratio by manufacturing the plastic foam composition of matter in such a manner that cellular walls are formed in the plastic foam composition of matter.

It is further yet an object of the present invention to utilize molds in the production of the first, second, and third shells to form the shells in a specific shape, such as a honeycomb shape, such that the cut and trimmed sections or slices have a cellular or honeycomb structure, with resultant improved strength-to-density properties.

It is further still an object of the present invention to provide a method of producing a plastic foam composition of matter comprising the steps of:

(a) providing an acidic mixture (e.g. isocyanic acid) that is capable of foaming a plastic resin/plastic foaming agent/catalyst;

(b) providing a plastic resin/plastic foaming agent/catalyst which is capable of being foamed by the acidic mixture;

(c) mixing a first portion of the acidic mixture with a first portion of the, plastic resin/plastic foaming agent/catalyst to produce a first mixture;

(d) pouring simultaneously the first mixture of step (c) in a form of a first row on a generally planar surface;

(e) curing the first row of step (d) to produce a first row of foamed plastic having a first shell thereof;

(f) mixing a second portion of the acidic mixture with a second portion of the plastic resin/plastic foaming agent/catalyst to produce a second mixture;

(g) pouring simultaneously the second mixture of step (f) in a form of a second row on the generally planar surface juxtaposed to and in contact with the first shell of step (e);

(h) curing the second row of step (g) to produce a second row of foamed plastic having a second shell thereof that is bound to the first row of step (e) and comprises the second shell thereof terminating in the first shell to form a first trough between the first shell and the second shell;

(i) mixing a third portion of the acidic mixture with a third portion of the plastic resin/plastic foaming agent/catalyst to produce a third mixture;

(j) pouring simultaneously the third mixture of step (i) in a form of a third row in the first trough of step (h) so as to be in contact with the first shell of step (e) and the second shell of step (h);

(k) curing the third row of step (j) to produce a third row of foamed plastic having a third shell thereof, the third shell being bound to the first row and to the second row, having the second shell terminating in the first shell and the third shell terminating in the second shell, and such that a vertical sectional view through the plastic foam composition of matter defines each of the first, second, and third shells as being convex.

It is further yet still an object of the present invention to provide a method for producing a generally pyramidally shaped plastic composition of matter comprising the steps of:

(a) mixing an acidic mixture with a plastic resin/plastic foaming agent/catalyst to produce a foaming mixture;

(b) depositing a row of the foaming mixture on a generally planar surface;

(c) curing the row to produce a row of foamed plastic having a shell;

(d) repeating steps (a)–(c) for depositing a row contiguous to the row of step (c) such that a trough is formed therebetween;

(e) repeating steps (a)–(d) for depositing a plurality of generally parallel contiguous rows until a desired number of rows is deposited such that any two contiguous rows defines a trough therebetween; and (f) repeating steps (a)–(d) to deposit rows in the troughs defined between any two contiguous rows to form a generally pyramidally shaped composition of matter generally comprising layers of contiguous rows disposed in troughs between underlying layers of contiguous rows.

It is further still an object of the present invention to provide a method of fabricating a surfboard or sailboard comprising the steps of: providing a foam billet with an internal cellular structure; providing laminating materials; shaping the foam billet into a surfboard shape; and laminating the foam billet with the laminating materials to form a hard shell therearound and produce a surfboard or sailboard.

It is further still an object of the present invention to provide a method for producing a plastic composition defining hexagonally shaped cellular walls comprising the steps of:

(a) providing a plurality of rod members having an hexagonally shaped horizontal cross section;

(b) providing an adhesive;

(c) disposing a portion of the adhesive on a first rod member;

(d) securing a second rod member to the first rod member; and (e) repeating steps c–d for successive rod members.

It further still yet an object of the present invention to provide a method for producing a foam board having hexagonally shaped cellular walls formed of hexagonally shaped foam rods comprising the steps of:

(a) providing a plastic that is capable of foaming, an injecting means, and glue;

(b) providing a first mold comprising an first interior mold area defining a half-honeycomb shape and a second mold comprising a second interior mold area defining a half-honeycomb shape;

(c) disposing the molds such that the first interior mold area and the second interior mold area form a continuous mold area which is honeycomb shaped in cross-section;

(d) causing the plastic to foam;

(e) injecting the foam into the continuous mold area with the injecting means;

(f) curing the foam of step (e) to produce hexagonally shaped foam rod defining six hexagon sides;

(g) removing the hexagonally shaped foam rod from the first mold and the second mold;

(g) repeating steps (c)–(g) to produce a plurality of hexagonally shaped foam rods each having six hexagon sides;

(h) gluing the plurality of hexagonally shaped rods together such that at least two of the six hexagon sides of any one of the plurality of hexagonally shaped rods are glued to at least two more of the plurality of hexagonally shaped rods to produce a plastic composition of matter defining cellular hexagonally shaped walls in vertical cross section.

These, together with the various ancillary objects and features which will become apparent to those skilled in the art as the following description proceeds, are attained by this novel method of producing strong foam, a preferred embodiment as shown with reference to the accompanying drawings, by way of example only, wherein;

BRIEF DESCRIPTION OF THE DRAWINGS

FIG. 5 is a perspective view of the first row of FIG. 4 having a second row generally contiguous and generally parallel to the first row and defining a trough therebetween between;

DETAILED DESCRIPTION OF THE INVENTION

Figure 1:
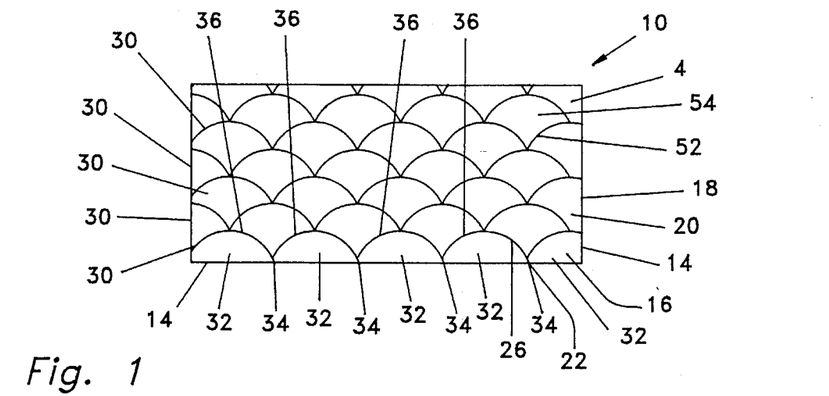
FIG. 1 is a cross-sectional view of a foam composition of matter formed by laying a first substrate comprising a plurality of generally constant diameter rows of foamable plastic on a surface, curing the rows, then laying a second substrate comprising another plurality of rows atop the previous layer, curing the latter substrate, and repeating the process to produce a foam board having a arcuate cellular walls in vertical cross section.

Turning now to the drawings wherein similar parts of the invention are identified by like reference numbers, there is seen in FIG. 1 a plastic foam composition of matter, hereinafter also referred to as a foam core or a foam board, generally illustrated as 10. The foam core 10 is produced according to the novel method of the invention.

Figure 8:
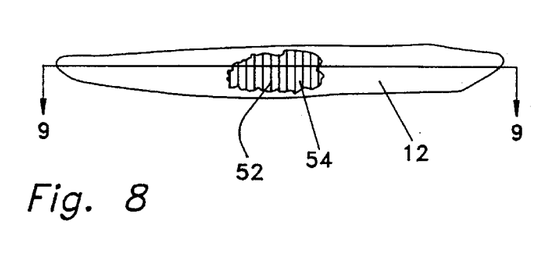
FIG. 8 is a side elevational view of a surfboard formed with the foam board fabricated according to the invention with the cut-away section disclosing cellular walls of the foam board.
Figure 9:
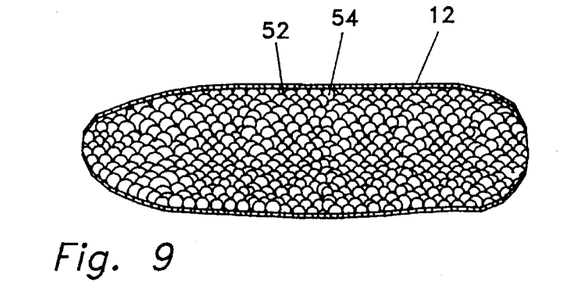
FIG. 9 is a horizontal sectional view taken in direction of the arrows and along the plane of lines 9—9 in FIG. 8, disclosing the cellular structure of the foam board of the surfboard.

The foam core 10 has particular importance in constructing sailboards or surfboards 12, as shown in FIGS. 8 and 9; however, since the foam core 10 has superior properties of total strength and specific strength (i.e., strength-to-density ratio, as will be discussed), it will be understood that the improved foam core 10 may be used in any apparatus or application where the foam core 10 may be advantageously used, such as, by way of example only and not limited to, home built and/or light aircraft, building materials, as a packing material, or the like. Therefore, while the present invention is exemplified primarily in the construction of surfboards or sailboards, any suitable use of the improved foam board is intended, and any use of the foam core in any such application which does not include a surfboard or sailboard should not be construed so as to limit the spirit and/or scope of the present invention.

The improved foam core 10 is based on or manufactured from any suitable foamable plastic 4, preferably a rigid plastic such as polyester-urethane, P.V.C., high impact polystyrene, or the like. In a preferred embodiment, the foam core 10 consists primarily of a commercial urethane two-part (i.e. Parts A and B) foam system, such as a two part foam system sold under the trade name of X-40 by the Tap Plastics Company of Dublin California. The two-part foam system comprises a plastic resin/plastic foaming agent/ catalyst 3 (i.e. Part A) for foaming into an eventual rigid cellular plastic (e.g. the foam core 10), and isocyanic acid 2 (i.e. Part B) that is capable of mixing with the plastic resin/plastic foaming agent/catalyst 3 such that when the mixture of isocyanic acid 2/plastic resin/plastic foaming agent/catalyst 3 hardens, a rigid cellular plastic (e.g. the foam core 10) is formed. The plastic resin/plastic foaming agent/catalyst 3 preferably comprises a majority proportion of polyether polyol (i.e. urethane resin), and a minor proportion of tertiary amine (i.e. a catalyst for accelerating the curing process) and 1,1 Dichlorol-1-Fluoroethane (i.e. a foaming agent that makes the plastic into foam as it cures), all mixed together in amounts or in any suitable quantities to produce the results of the present invention, especially when mixed with isocyanic acid (i.e. Isocyanate), to produce the foam core 10.

The Part A plastic resin/plastic foaming agent/catalyst 3 and the Part B isocyanic acid 2 may be mixed together in any suitable stoichiometric ratio, such as from about 0.5:1 to about 1.5:1, preferably around or about 1:1. The Part A plastic resin/plastic foaming agent/catalyst 3 and the Part B isocyanic acid 2 may be admixed at any suitable temperature, such as by way of example only from about 50 degrees Fahrenheit to about 90 degrees Fahrenheit, preferably around room temperature. It should be understood that the spirit and scope of the present invention includes that any foamable plastic (resin) 4 may be used in the method of the current invention, and use of any foamable plastic (resin) 4 is encompassed by the spirit and scope of the present invention, and that the subject invention should not be limited to foamable plastic (resin) 4 consisting of urethane only.

Figure 6:
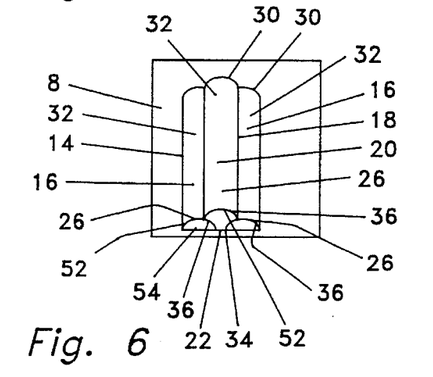
FIG. 6 is a perspective view of a the first row and the second row of FIG. 5 having a third row superimposed on the first row and second row such that the third row generally emanates from the trough between the first and second rows.

The foam core 10 comprises, as shown in FIG. 6, a substrate, generally illustrated as 14, which substrate comprises at least two rows 16—16 of foamed plastic 4 (e.g. polyurethane which has been foamed) and another substrate 18, which comprises at least one row 20 of foamed plastic 4 (e.g. polyurethane which has been foamed). The substrate 14 comprises at least two rows 16—16, preferably a plurality of the rows 16—16 (as will be discussed), of foamed plastic 4. The substrate 18 comprises at least one row 20, more preferably a plurality of the rows 20 (as will be discussed). The number or quantity of rows 16,20 may be any number or quantity desired to achieve a desired width such that the number of rows 16,20 may comprise as many rows necessary to achieve the desired width. Additionally, the rows 16-20 may be as long as necessary to achieve a desired length. Further, the number or quantity of substrates, 14,18 may be any number or quantity of alternating substrates 14,18 necessary to achieve a desired height.

Figure 4:
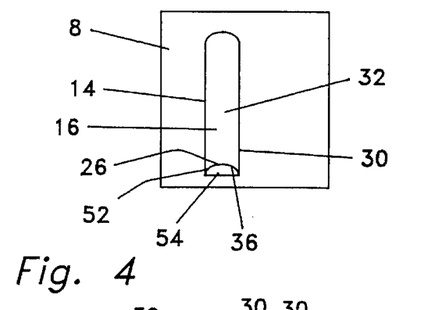
FIG. 4 is perspective view of a first row of foamed plastic having a generally semi-circular cross-section disposed on a planar surface.
Figure 5:
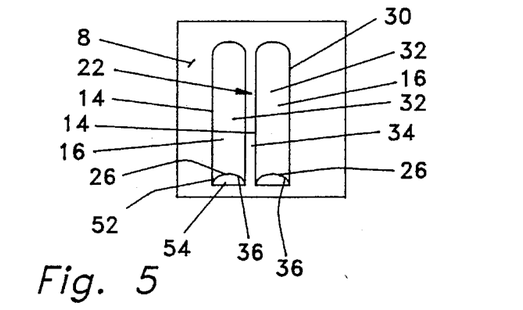

The substrate 14 is formed by laying successive rows 16 in a typically parallel and contiguous relationship, such that the rows 16 are allowed to cure. Stated alternatively, the first row 16 is disposed on a planar surface 8 (i.e. any durable surface such as metal, plastic, wood, having a releasing agent applied to it, but preferably polyethylene because of its natural release qualities), as shown in FIG. 4, and allowed to cure such that the row 16 forms a hardened shell 26 that is of the same material or composition as the row 16. A second row 16 is disposed generally contiguous (and/or in contact with) and generally parallel to the cured first row 16, as shown in FIG. 5, and allowed to cure such that the second row 16 forms a second hardened shell 26 that is or consists of the same material or composition as the row 16. An intersection or trough 22 (or channel or the like) is defined between the first row 16 and the second row 16, as shown in FIG. 5. It may be appreciated that the rows 16-16 may be in contact with each other at trough 22 such that the rows 16—16 mate and are contiguous. Thus the rows 16—16 may be in contact with each other, or the rows 16—16 may have a space therebetween. Whether the rows 16—16 contact or are spaced shall not be construed to limit the spirit and/or scope of the present invention. As will be discussed, the rows 16—16 become bound by row 20 which is disposed in the trough 22; therefore, the case of whether or not any two rows 16—16 are contiguous and/or in contact is moot, as the rows 16—16 become coupled by the superimposed row or rows 20 which also cure or harden with a third hardened shell 26 that is preferably of the same material or composition as row(s) 20. The substrate 18 is formed by disposing the least one row 20 in the trough 22 and on the hardened shells 26—26 of the rows 16—16, as best shown in FIG. 6, such that the row 20 of the substrate 18 interconnects the rows 16—16 of the substrate 14. Thus, the foam board 10 comprises at least the pair of first rows 16—16 and the second row 20 interconnecting the first rows 16—16. Preferably, as indicated earlier, a plurality of rows 16—16 and a plurality of rows 20 are contiguously disposed or layered and stacked to achieve a desired height and width.

Figure 3:
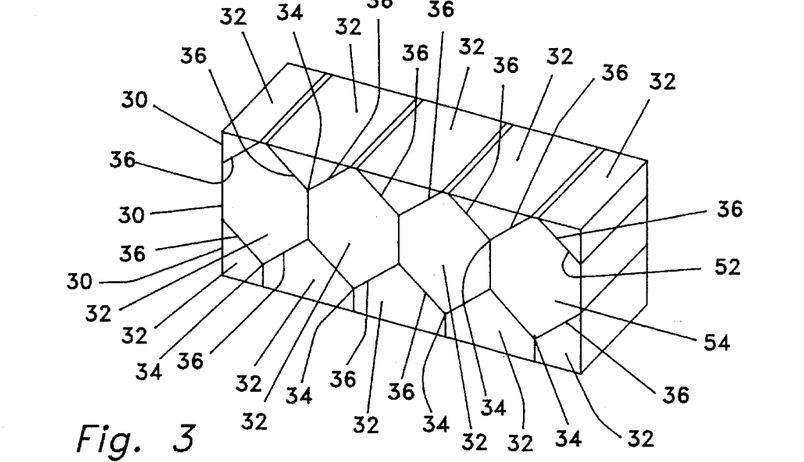
FIG. 3 is a perspective view of a foam board having a honeycomb structure.
Figure 7:
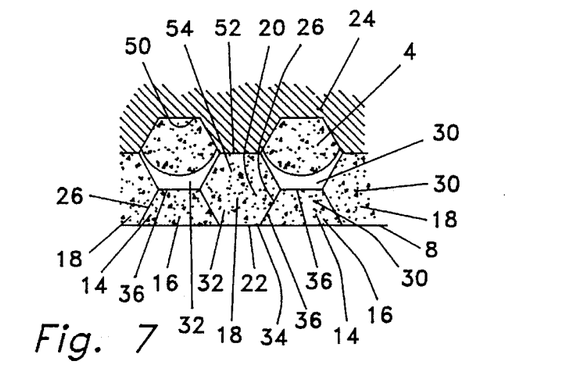
FIG. 7 is a partial cross-sectional view of a foam board being formed with a hexagonally shaped mold.
Figure 13:
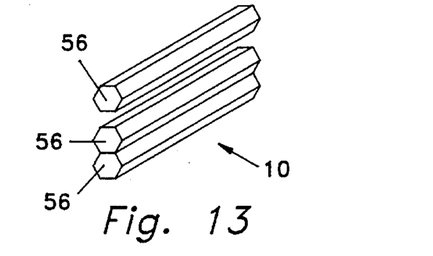
FIG. 13 is a perspective view of a method for adhering a plurality of hexagonally-shaped foam rows being adhered to form the hexagonally-shaped cross section foam board of FIG. 3.

It may be appreciated that in another preferred embodiment of the present invention, the rows of foam 16—16-20, as shown in FIG. 7, may be pre-formed with the use of a mold 24, for lending the cured foam rows 16—16-20 a certain shape. The hexagonal or honeycomb shape as shown in FIG. 7 is achieved by forming the first substrate 14 with the mold 24 and subsequently forming the second substrate 18 thereon with the mold 24. The first substrate 14 is formed by disposing the first row 16 of the foamable plastic (resin) 4 on the planar surface 8 and placing concave honeycomb-like section 50 of the mold 24 on the row 16 to cause the row 16 to cure in the shape of a half honeycomb. The second row 16 is disposed on the planar surface 8 and the mold 24 is employed to cause the row 16 to cure in the shape of a half honeycomb. Row 20 is then formed between the two half-honeycomb shaped rows 16—16 by disposing the row 20 between the rows 16—16 and placing the mold 50 on top of the row 20 to cure the row 20 in the shape of a hexagon or honeycomb. The mold 24 is thus employed to cure the row 20 in a honeycomb shape by using the half-honeycomb shape defined by the rows 16—16 and the planar surface 8, and the mold 50 opposed thereto. As can be seen from FIG. 7, the trough 22 thus defines a half-honeycomb shape or half-hexagon shape as well. It can be appreciated that the foamable plastic (resin) 4 may be disposed in the concave honeycomb sections 50—50 of the mold 24 prior to disposing the mold on the planer surface 8 or in the troughs 22—22. Alternatively, as it may be further appreciated, rows of honeycomb-shaped foam may be produced and cured with the use of a pair of the half-hexagonally shaped or half honeycomb shaped molds 24 (having a predetermined or desired row length) which are arranged in an opposed relationship defining a hexagonal inner mold area for producing hexagonally shaped rows by injecting foam therein with a foam injecting means (not shown). Such foam injecting means are old and well-known devices in the art. Thus, produced hexagon rows or rods 56 (see FIG. 13) may be subsequently glued or otherwise inter-engaged or secured together to form the foam board 10 with the honeycomb cross-section structure shown in FIGS. 3 and 7. Such a procedure is preferred, especially in automated production of the foam core 10, as stocks of honeycomb-shaped rows may be established and subsequently assembled (i.e. glued or otherwise secured together) on demand to form the foam core 10.

Figure 10:
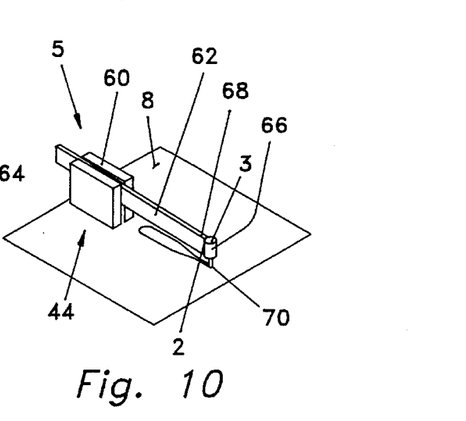
FIG. 10 is a perspective view of a dispensing means for foamable plastic and which is dispensing foamable plastic.

A means for disposing the foamable plastic 4 on the planar surface 8, is generally illustrated as 5 in FIG. 10. The means 5 may comprise any suitable means for disposing the foamable plastic 4 on the planar surface 8 such as by way of example only, an apparatus or assembly 44 as shown in FIG. 10. A cup shaped dispenser member 66, for receiving a quantity of mixed isocyanic acid 2 and/or plastic resin/plastic foaming agent/catalyst 3 has a dispensing nozzle 70 in communication with the cup shaped portion of the dispenser member 66, and the dispenser member 66 is secured to one end 68 of a longitudinally extending arm member 62. The longitudinally extending arm member 62 is movably coupled to a support frame 60 such that the arm member 62 may extend longitudinally movably therefrom by means of a roller support member 64 (shown as dashed lines in FIG. 10). As also seen in FIG. 10, the support frame 60 is removably secured to one edge of the planar surface 8 such that the longitudinally extending arm member 62 movably extends or movably projects (in direction of arrow A in FIG. 10) for depositing on planar surface 8 a bead or row of foamable plastic 4 which commences foaming very shortly after being dispensed. Prior to being disposed in the dispensing member 66, the foamable plastic 4 (e.g. polyurethane) is produced by mixing isocyanic acid 2 with the plastic resin/plastic foaming agent/catalyst 3 (e.g. a polyurethane/foaming agent/catalyst) in a suitable container (not shown in the drawings) and is subsequently disposed therefrom into the cup shaped portion of the dispenser member 66 all prior to the commencement of foaming (i.e. a semi-liquid state). The foamable plastic 4 is dispensed onto planar surface 8 by moving and extending the arm member 62 therealong (with a hand, electric motor, or any other suitable means) in direction of arrow A. The dispenser member 66 would typically be in communication with a source or supply of a mixture of isocyanic acid 2/plastic resin/plastic foaming agent/catalyst 3, or to individual sources or supplies of isocyanic acid 2 and plastic resin/plastic foaming agent/catalyst 3 which become admixed within the cup shaped portion of the dispenser member 66 when introduced therein. Thus, prior to being disposed in the cup shaped portion of the dispenser member 66, the plastic resin/plastic foaming agent/catalyst 3 may be administered to the isocyanic acid 2 to form a mixture (e.g. polyurethane plastic and a foaming agent/catalyst) to produce and to cause the foamable plastic 4 to commence to foam, especially when deposited on the planar surface 8; or the plastic resin/plastic foaming agent/catalyst 3 may be administered to the isocyanic acid 2 subsequent to disposal of same on the planar surface 8. Preferably, the isocyanic acid 2 and plastic resin/plastic foaming agent/catalyst 3 are thoroughly admixed prior to disposal on the planar surface 8 where the deposited mixture foams to produce foamable plastic 4 and cures or hardens. It is to be understood that any means suitable for containing the foamable plastic and administering same on the planar surface 8 is intended, and that the means 5 should not be construed to unduly limit the spirit and/or scope of the invention. For example, an apparatus for automatically creating a plurality of rows and substrates which comprises a pressurized or hydraulic dispensing apparatus which is electronically and/or mechanically controlled may be employed, or molds for creating the rows. Means 5 shall not unduly limit the spirit and scope of the present invention.

Turning to FIG. 1 for an alternative description of the foam board 10, it is evident from FIG. 1 that the foam core 10 may comprise more than the two rows 16—16 depicted in FIG. 6, or more than the one row 20 illustrated in FIG. 6 (or, stated alternatively, more than the two substrates 14–18 of FIG. 6). The foam core 10, as shown in FIG. 1, comprises a plurality of substrates 30—30—30—30—30—30—30, each formed of a plurality of rows 32—32—32—32—32—32, having troughs 34—34—34—34—34—34. Typically, any one trough 34 is defined between any two rows 32—32 (although it is appreciated that at the outer boundaries of the foam core 10, there may be a trough 34 that is not necessarily defined by two rows 32—32, as one of the rows may not be formed or may have been cut away). As further shown in FIG. 1, the rows 32—32—32—32—32—32 of each substrate 30—30—30—30—30—30 are arranged or disposed such that the rows 32—32—32—32—32—32 of a superimposed substrate (i.e. a substrate 30 arranged on top of a lower substrate 30) are disposed or arranged in corresponding troughs 34—34—34—34—34—34 (i.e. one superimposing row 30 per one subordinated trough 34) of the subordinated substrate 32. Stated alternatively, each substrate 30 consists of a plurality of rows 32—32—32—32—32—32 arranged in the troughs 34 of the previous substrate 30, except for the bottom most substrate 30 which is typically disposed on planar surface 8 or otherwise defines an external boundary. Each row 32 has a hardened shell 36 which is formed from the same material or composition of the rows (e.g. rows 32) when the foamed plastic contacts the air and cures; and, as previously discussed, each row 32 of each substrate is formed serially or sequentially (i.e. one-at-a-time) to allow the hardened shell 36 of the row 32 to form. Therefore, the bottom-most substrate 30 (see FIG. 2) is formed first by laying an individual row 32, curing the laid row 32 to form the shell 36, laying another row 32, curing the laid row 32 to form the shell 36, and repeating the process until the desired width (as indicated by line 40 in FIG. 2) of the substrate 32 is reached. The subsequent substrate 30 is accordingly formed, with the rows 32 of the subsequent substrate 30 being formed in the troughs between the rows 32 of the bottom-most substrate 30. The process is repeated until the width of the subsequent substrate 30 is substantially equal to the width 40 of the bottom-most substrate 30. The process is further repeated to deposit additional substrates 30 until a desired height is reached. After all row and/or substrates have been deposited and cured to form a rigid cellular plastic, the latter may be cut, sawed (or any of the like) to fabricate or produce the desired product (e.g. a surfboard).

Figure 2:
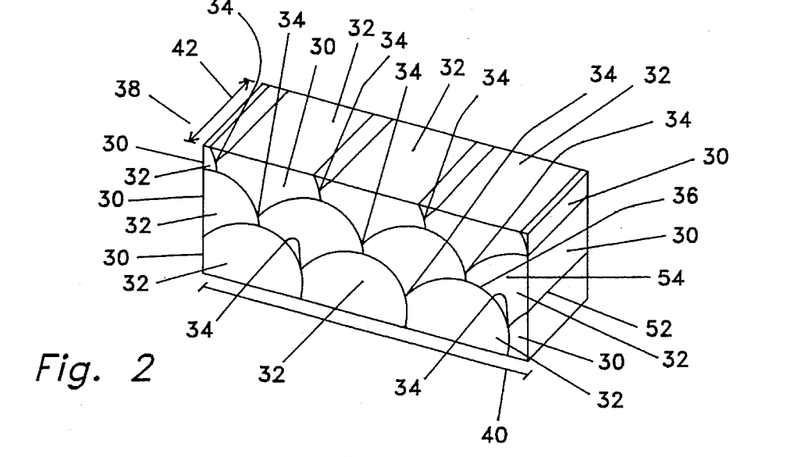
FIG. 2 is a perspective view of a foam board similar to that depicted in FIG. 1.

It may be evident that the hardened shells 36 are formed such that a depth, indicated by arrow 42 in FIG. 2, of the shells 36 is defined, and which depth of the shells 36 is substantially linear or straight. Further, the walls or shells 36 (and shells 26 of FIGS. 4–6) are disposed or formed such that each wall or shell 36 intersects a plane 38 (shown in FIG. 2 in dashed lines) substantially or essentially perpendicular or normal thereto along any point of the walls or shells 36 (or shells 26). Thus, when the foam core 10 is turned such that plane 38 is generally horizontal, the walls or shells 36 are vertical, as shown in FIG. 1.

It can be seen that the foam core 10 that is produced by the above procedure substantially comprises a cellular structure (in cross section); and as shown in FIG. 1, the foam core 10 in cross section comprises cellular walls 52 which are defined by the hardened shells 36 of each row 32 that comprises the foam core 10. It is understood that the use of the term "cellular" in this sense refers to a "cell" of foamed plastic 4 which is delineated or defined by the walls 52, (i.e. one "cell" comprises a wall 52 and all of the foamed plastic bounded therein). This clarification is made as foam is inherently cellular in composition (i.e. generally spherical plastic which delimits a pocket of air), and distinction is necessary between the "cells" of the invention (which comprises foamed plastic 4 and walls 52), and each individual pocket of air so as to absolutely avoid being vague or indefinite. The "cells" (i.e. shells 36, shells 26, and/or cellular walls 52) of the invention define an aggregation of parallel lines (or an arcuate plane in the case of the arcuate shells 26 of FIGS. 4–6). Stated alternatively, the "cells" (i.e. shells 36, shells 26, and/or cellular walls 52) are not spherical and not formed by air.

Since, as previously mentioned, the walls 52 are typically normal to plane 38 (see FIG. 2), these walls 52 greatly enhance the strength of the foam core 10 in a direction perpendicular to plane 38, such that greatly increased pressure may be exerted on the foam core 10 in a direction perpendicular to plane 38 without causing the foam core 10 to yield significantly. More specifically, as shown in FIG. 9, the foam core 10 is utilized in the surfboard 12 (or sailboard) where there is resistance to downward pressure in or on the surfboard 12 (or sailboard) due to a greatly enhanced or improved strength to density ratio, as reinforcing members are eliminated. For use in the surfboard 12, a plurality of substrates 30 each having a plurality of rows 32 were formed to produce the foam core 10 which was subsequently cut and/or molded to the general shape of the surfboard 12 prior to disposing layers of laminating or coating material (such as fiberglass cloth and polyester resin) to produce the surfboard 12 (or sailboard). As surfboards are old and well-known in the art, detailed description of surfboard fabrication is not needed.

The invention will be further illustrated by the following set forth examples which are given by way of illustration and as current known best mode and not by way of any limitations. All parameters such as densities, concentrations, weights, ratios, proportions, compounds, etc. submitted in these examples shall not be construed to unduly limit the scope of my invention.

EXAMPLE I

In testing the improved strength properties of the foam core 10, samples of the foam core 10 were fabricated with the help of the means 5 (see FIG. 10 and FIGS. 4–6) for dispensing a constant diameter row 32 of the foamable plastic (resin) 4. A two part urethane foam system was used to produce the rows 32. The two part urethane foam system was purchased under the trade name X-40 from the Tap Plastics Company of Dublin California and included a Part B comprising isocyanic acid (Isocyanate) and a Part A plastic resin/plastic foaming agent/catalyst comprising a majority proportion of polyether polyol (urethane resin), and a minority proportion of tertiary amine (catalyst) and 1,1 dichlorol-1-fluoroethane (foaming agent), all mixed in a stoichiometric amount or in any suitable respective quantities (see FIG. 10) for accomplishing the desired purposes of the present invention. When the Part A plastic resin/plastic foaming agent/catalyst 3 is stoichiometrically mixed with the Part B isocyanic acid (Isocyanate) 2 in about 1:1 volume ratio at room temperature, the foamable plastic 4 is produced and begins to foam. Referring now to FIG. 10, the foamable plastic 4 (e.g. polyurethane) was produced by the Part B isocyanic acid and the Part A plastic resin/plastic foaming agent/catalyst 3 which were mixed before or premixed in about 1:1 volume ratio in a container (not shown in the drawings) and subsequently added to the cup shaped dispenser member 66. The mixture of isocyanic acid 2/plastic resin/plastic foaming agent catalyst 3 was subsequently dispensed from the means 5 (i.e. through the dispensing nozzle 70) so as to lay the row 32 of foamed plastic 4 on the planar surface 8 (see FIG. 4) as the mixture foamed. Another row 32 (see FIG. 5) was accordingly and similarly produced and disposed contiguously to the first row 32 to form the first layer or substrate 30 of foam rows 32. Each of the rows 32 were subsequently cured for a duration of about one hour to form the outer shells 36—36 (i.e, each row 32 was cured individually, so as to form the attendant outer shell 36). Then, another layer 30 of rows 32 was accordingly and similarly produced, disposed, and cured on top of and within troughs 22 and/or 34 of the cured layer 30, in the same direction, such that the rows 32 were superimposed in troughs 34 formed between two rows 32—32 of the first layer 14. The diameter of each row 32 was about ¼ inch when it was dispensed, which produced a foam core 10 having the arcuate cellular walls 52 which measured from about one and one half inch to about two inches in diameter. The process of laying rows and curing was repeated until a core of foam 10 having a desired thickness (e.g. a thickness for a surfboard 12, wing, or the like) was attained. After the last layer 30 of foam 4 was cured, the foam core 10 of multiple layers 30—30 (see FIG. 1) of multiple rows 32—32—32 was cut vertically and trimmed to produce a rigid foam sample having a cross-section similar to that shown in FIG. 1. Three test samples of core 10 were produced in accordance with the foregoing procedure and cut respectively to the dimensions of about 4.0" long, 1.5" wide, and 1.0" thick. The cellular walls 52 within each of the three test samples were about 0.015" thick and the average density of the cut and trimmed samples was about 3.93 pounds per cubic foot (pcf). The three test samples are respectively identified below as "Cellular Structure" Foam Core-Samples I, II, and III.

According to the method of the present invention, the relationship between the volume of a cell 54 (i.e. rows 32 being defined or bound by shells 36 or cells 54 being defined by walls 52) within the foam and the total thickness of the foam board 10 could be carried from or defined by from about $T^3/(V)=0.01$ to about $T^3/(V)=100$, where T=thickness and V=volume. The samples tested had a $T^3/(V)$ equal to about 1.5. The greater the thickness$^3$-to-volume (i.e. long thin cells 54 within the foam core 10), the greater the total strength would be of the foam board 10. However, the foam core 10 material would also be more dense and therefore heavier. In the range of $T^3/(V)$ equaling from about 0.01 to about 100, an optimum for the greatest specific strength (i.e. strength-to-density ratio) would depend on the plastic or foam system used to manufacture the foam board 10. For the example, the selected $T^3/(V)$ is about 1.5 for the X-40 urethane foam (i.e. foamable plastic 4) used in the sample.

Figure 14:
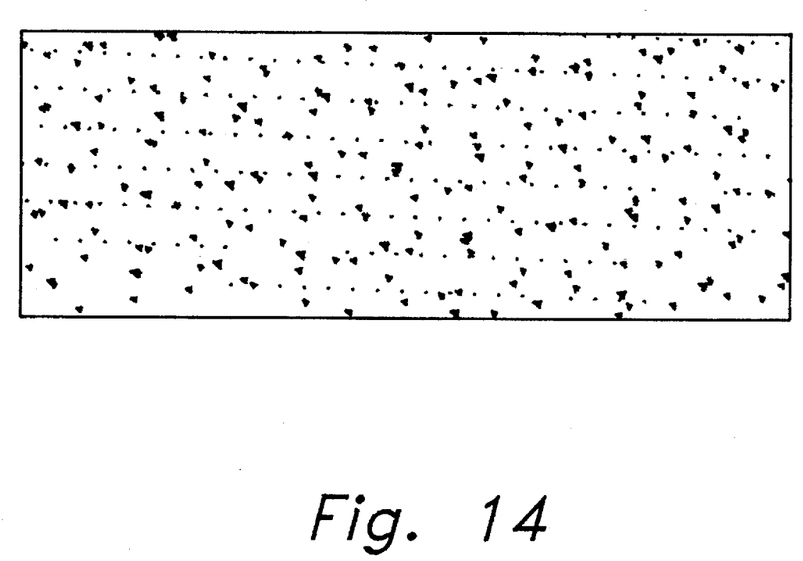
FIG. 14 is a cross-sectional view of a cut and trimmed conventional foam core produced in accordance with or in a conventional manner and not having the shells (i.e. the arcuate shells produced in accordance with the subject invention).

As test controls, or for a comparative test basis, samples of foam without a cellular structure were produced with the same X-40 trade name system as described above. In this case, a larger amount of foamable plastic was mixed at once and allowed to free-form in one place on a flat surface, and the resultant billet of plain foam was cut in three places and trimmed to similar physical dimensions, as before, to produce three test samples of "standard" foam, with an average density of 2.43 pcf. The three test samples of standard foam (a cross section of one shown in FIG. 14) are respectively identified below as "Standard" Foam Core-Sample I, II, and III.

Unconfined compression tests through samples of each type of foam were conducted using a model S610 CBR/UCC Brainard Kilman testing machine. The testing machine applied compression in a direction perpendicular to plane 38 (see FIG. 2). The rate of compression was set at about 0.5 inches/minute. Load readings were taken at 0.01 inch intervals. The samples were compressed to a total strain of 20% (0.2 inches). The results are tabulated below, as "standard" foam and as "cellular" foam. The physical characteristics (i.e. weight, height, depth, etc.) are tabulated in Table A, and Tables B1, B2, B3, C1, C2, and C3 compare the total strength and specific strength of each respective sample. The physical properties for the respective samples follow in Table A below:

TABLE A

| Sample No. | length (in) | width (in) | height (in) | weight (gram) | density (pcf) |
|---|---|---|---|---|---|
| "Standard" I | 4.018 | 1.495 | 0.998 | 3.75 | 2.38302 |
| "Standard" II | 4.005 | 1.508 | 0.995 | 3.93 | 2.49140 |
| "Standard" III | 3.980 | 1.503 | 0.993 | 3.78 | 2.42425 |
| "Cellular" I | 4.015 | 1.498 | 1.010 | 6.29 | 3.94466 |
| "Cellular" II | 4.020 | 1.500 | 1.015 | 6.35 | 3.95246 |
| "Cellular" III | 3.993 | 1.508 | 1.013 | 6.26 | 3.90968 |

TABLE B1

"Standard" Foam Core-Sample I

| Load (lbs) | True Deformation (in) | Strain % | Stress (psi) | Specific Stress (psi/pcf) |
|---|---|---|---|---|
| 10 (lbs) | 0.005 (in) | 0.501% | 1.665 (psi) | 0.699 (psi/pcf) |
| 29 (lbs) | 0.015 (in) | 1.503% | 4.828 (psi) | 2.026 (psi/pcf) |
| 52 (lbs) | 0.025 (in) | 2.505% | 8.657 (psi) | 3.633 (psi/pcf) |
| 74 (lbs) | 0.035 (in) | 3.507% | 12.319 (psi) | 5.170 (psi/pcf) |
| 98 (lbs) | 0.045 (in) | 4.509% | 16.315 (psi) | 6.846 (psi/pcf) |
| 116 (lbs) | 0.055 (in) | 5.511% | 19.311 (psi) | 8.104 (psi/pcf) |
| 130 (lbs) | 0.065 (in) | 6.513% | 21.642 (psi) | 9.082 (psi/pcf) |
| 140 (lbs) | 0.075 (in) | 7.515% | 23.306 (psi) | 9.780 (psi/pcf) |
| 146 (lbs) | 0.085 (in) | 8.517% | 24.305 (psi) | 10.199 (psi/pcf) |
| 149 (lbs) | 0.095 (in) | 9.519% | 24.805 (psi) | 10.409 (psi/pcf) |
| 150 (lbs) | 0.105 (in) | 10.521% | 24.971 (psi) | 10.479 (psi/pcf) |
| 151 (lbs) | 0.115 (in) | 11.523% | 25.138 (psi) | 10.549 (psi/pcf) |
| 152 (lbs) | 0.125 (in) | 12.525% | 25.304 (psi) | 10.619 (psi/pcf) |
| 153 (lbs) | 0.135 (in) | 13.527% | 25.471 (psi) | 10.688 (psi/pcf) |
| 153 (lbs) | 0.145 (in) | 14.529% | 25.471 (psi) | 10.688 (psi/pcf) |
| 154 (lbs) | 0.155 (in) | 15.531% | 25.637 (psi) | 10.758 (psi/pcf) |
| 155 (lbs) | 0.165 (in) | 16.533% | 25.804 (psi) | 10.828 (psi/pcf) |
| 156 (lbs) | 0.175 (in) | 17.535% | 25.970 (psi) | 10.898 (psi/pcf) |
| 157 (lbs) | 0.185 (in) | 18.537% | 26.137 (psi) | 10.968 (psi/pcf) |
| 158 (lbs) | 0.195 (in) | 19.539% | 26.303 (psi) | 11.038 (psi/pcf) |

TABLE B2

"Standard" Foam Core-Sample II

| Load (lbs) | True Deformation (in) | Strain % | Stress (psi) | Specific Stress (psi/pcf) |
|---|---|---|---|---|
| 15 (lbs) | 0.008 (in) | 0.804% | 2.484 (psi) | 0.997 (psi/pcf) |
| 34 (lbs) | 0.018 (in) | 1.809% | 5.630 (psi) | 2.260 (psi/pcf) |
| 56 (lbs) | 0.028 (in) | 2.814% | 9.272 (psi) | 3.722 (psi/pcf) |
| 83 (lbs) | 0.038 (in) | 3.819% | 13.743 (psi) | 5.516 (psi/pcf) |
| 109 (lbs) | 0.048 (in) | 4.824% | 18.048 (psi) | 7.244 (psi/pcf) |
| 128 (lbs) | 0.058 (in) | 5.829% | 21.194 (psi) | 8.507 (psi/pcf) |
| 145 (lbs) | 0.068 (in) | 6.834% | 24.008 (psi) | 9.637 (psi/pcf) |
| 153 (lbs) | 0.078 (in) | 7.839% | 25.333 (psi) | 10.168 (psi/pcf) |
| 157 (lbs) | 0.088 (in) | 8.844% | 25.995 (psi) | 10.434 (psi/pcf) |
| 159 (lbs) | 0.098 (in) | 9.849% | 26.327 (psi) | 10.567 (psi/pcf) |
| 160 (lbs) | 0.108 (in) | 10.854% | 26.492 (psi) | 10.633 (psi/pcf) |
| 160 (lbs) | 0.118 (in) | 11.859% | 26.492 (psi) | 10.633 (psi/pcf) |
| 160 (lbs) | 0.128 (in) | 12.864% | 26.492 (psi) | 10.633 (psi/pcf) |
| 161 (lbs) | 0.138 (in) | 13.869% | 26.658 (psi) | 10.700 (psi/pcf) |
| 162 (lbs) | 0.148 (in) | 14.874% | 26.823 (psi) | 10.766 (psi/pcf) |
| 163 (lbs) | 0.158 (in) | 15.879% | 26.989 (psi) | 10.833 (psi/pcf) |
| 163 (lbs) | 0.168 (in) | 16.884% | 26.989 (psi) | 10.833 (psi/pcf) |
| 165 (lbs) | 0.178 (in) | 17.889% | 27.320 (psi) | 10.966 (psi/pcf) |
| 166 (lbs) | 0.188 (in) | 18.894% | 27.486 (psi) | 11.032 (psi/pcf) |
| 167 (lbs) | 0.198 (in) | 19.899% | 27.651 (psi) | 11.099 (psi/pcf) |

TABLE B3

"Standard" Foam Core-Sample III

| Load (lbs) | True Deformation (in) | Strain % | Stress (psi) | Specific Stress (psi/pcf) |
|---|---|---|---|---|
| 7 (lbs) | 0.005 (in) | 0.504% | 1.170 (psi) | 0.483 (psi/pcf) |
| 22 (lbs) | 0.015 (in) | 1.511% | 3.678 (psi) | 1.517 (psi/pcf) |
| 42 (lbs) | 0.025 (in) | 2.518% | 7.021 (psi) | 2.896 (psi/pcf) |
| 66 (lbs) | 0.035 (in) | 3.525% | 11.033 (psi) | 4.551 (psi/pcf) |
| 90 (lbs) | 0.045 (in) | 4.532% | 15.045 (psi) | 6.206 (psi/pcf) |
| 111 (lbs) | 0.055 (in) | 5.539% | 18.556 (psi) | 7.654 (psi/pcf) |
| 129 (lbs) | 0.065 (in) | 6.546% | 21.565 (psi) | 8.895 (psi/pcf) |
| 141 (lbs) | 0.075 (in) | 7.553% | 23.571 (psi) | 9.723 (psi/pcf) |
| 149 (lbs) | 0.085 (in) | 8.560% | 24.908 (psi) | 10.275 (psi/pcf) |

TABLE B3-continued

"Standard" Foam Core-Sample III

| Load (lbs) | True Deformation (in) | Strain % | Stress (psi) | Specific Stress (psi/pcf) |
|---|---|---|---|---|
| 152 (lbs) | 0.095 (in) | 9.567% | 25.410 (psi) | 10.482 (psi/pcf) |
| 153 (lbs) | 0.105 (in) | 10.574% | 25.577 (psi) | 10.550 (psi/pcf) |
| 154 (lbs) | 0.115 (in) | 11.581% | 25.744 (psi) | 10.619 (psi/pcf) |
| 155 (lbs) | 0.125 (in) | 12.588% | 25.911 (psi) | 10.688 (psi/pcf) |
| 156 (lbs) | 0.135 (in) | 13.595% | 26.078 (psi) | 10.757 (psi/pcf) |
| 156 (lbs) | 0.145 (in) | 14.602% | 26.078 (psi) | 10.757 (psi/pcf) |
| 156 (lbs) | 0.155 (in) | 15.609% | 26.078 (psi) | 10.757 (psi/pcf) |
| 158 (lbs) | 0.165 (in) | 16.616% | 26.413 (psi) | 10.895 (psi/pcf) |
| 159 (lbs) | 0.175 (in) | 17.623% | 26.580 (psi) | 10.964 (psi/pcf) |
| 160 (lbs) | 0.185 (in) | 18.630% | 26.747 (psi) | 11.033 (psi/pcf) |
| 161 (lbs) | 0.195 (in) | 19.637% | 26.914 (psi) | 11.102 (psi/pcf) |

TABLE C1

"Cellular Structure" Foam Core-Sample I

| Load (lbs) | True Deformation (in) | Strain % | Stress (psi) | Specific Stress (psi/pcf) |
|---|---|---|---|---|
| 17 (lbs) | 0.004 (in) | 0.396% | 2.827 (psi) | 0.717 (psi/pcf) |
| 57 (lbs) | 0.014 (in) | 1.386% | 9.477 (psi) | 2.403 (psi/pcf) |
| 117 (lbs) | 0.024 (in) | 2.376% | 19.453 (psi) | 4.932 (psi/pcf) |
| 185 (lbs) | 0.034 (in) | 3.366% | 30.759 (psi) | 7.798 (psi/pcf) |
| 258 (lbs) | 0.044 (in) | 4.356% | 42.897 (psi) | 10.875 (psi/pcf) |
| 319 (lbs) | 0.054 (in) | 5.347% | 53.039 (psi) | 13.446 (psi/pcf) |
| 367 (lbs) | 0.064 (in) | 6.337% | 61.020 (psi) | 15.469 (psi/pcf) |
| 393 (lbs) | 0.074 (in) | 7.327% | 65.342 (psi) | 16.565 (psi/pcf) |
| 408 (lbs) | 0.084 (in) | 8.317% | 67.836 (psi) | 17.197 (psi/pcf) |
| 413 (lbs) | 0.094 (in) | 9.307% | 68.668 (psi) | 17.408 (psi/pcf) |
| 415 (lbs) | 0.104 (in) | 10.297% | 69.000 (psi) | 17.492 (psi/pcf) |
| 415 (lbs) | 0.114 (in) | 11.287% | 69.000 (psi) | 17.492 (psi/pcf) |
| 416 (lbs) | 0.124 (in) | 12.277% | 69.167 (psi) | 17.534 (psi/pcf) |
| 417 (lbs) | 0.134 (in) | 13.267% | 69.333 (psi) | 17.576 (psi/pcf) |
| 419 (lbs) | 0.144 (in) | 14.257% | 69.665 (psi) | 17.661 (psi/pcf) |
| 420 (lbs) | 0.154 (in) | 15.248% | 69.832 (psi) | 17.703 (psi/pcf) |
| 421 (lbs) | 0.164 (in) | 16.238% | 69.998 (psi) | 17.745 (psi/pcf) |
| 423 (lbs) | 0.174 (in) | 17.228% | 70.330 (psi) | 17.829 (psi/pcf) |
| 425 (lbs) | 0.184 (in) | 18.218% | 70.663 (psi) | 17.914 (psi/pcf) |
| 427 (lbs) | 0.194 (in) | 19.208% | 70.995 (psi) | 17.998 (psi/pcf) |

TABLE C2

"Cellular Structure" Foam Core-Sample II

| Load (lbs) | True Deformation (in) | Strain % | Stress (psi) | Specific Stress (psi/pcf) |
|---|---|---|---|---|
| 20 (lbs) | 0.005 (in) | 0.493% | 3.317 (psi) | 0.839 (psi/pcf) |
| 58 (lbs) | 0.015 (in) | 1.478% | 9.619 (psi) | 2.434 (psi/pcf) |
| 128 (lbs) | 0.025 (in) | 2.463% | 21.227 (psi) | 5.371 (psi/pcf) |
| 201 (lbs) | 0.035 (in) | 3.448% | 33.333 (psi) | 8.434 (psi/pcf) |
| 273 (lbs) | 0.045 (in) | 4.433% | 45.274 (psi) | 11.455 (psi/pcf) |
| 334 (lbs) | 0.055 (in) | 5.419% | 55.390 (psi) | 14.014 (psi/pcf) |
| 382 (lbs) | 0.065 (in) | 6.404% | 63.350 (psi) | 16.028 (psi/pcf) |
| 411 (lbs) | 0.075 (in) | 7.389% | 68.159 (psi) | 17.245 (psi/pcf) |
| 428 (lbs) | 0.085 (in) | 8.374% | 70.978 (psi) | 17.958 (psi/pcf) |
| 434 (lbs) | 0.095 (in) | 9.360% | 71.973 (psi) | 18.210 (psi/pcf) |
| 434 (lbs) | 0.105 (in) | 10.345% | 71.973 (psi) | 18.210 (psi/pcf) |
| 434 (lbs) | 0.115 (in) | 11.330% | 71.973 (psi) | 18.210 (psi/pcf) |
| 435 (lbs) | 0.125 (in) | 12.315% | 72.139 (psi) | 18.252 (psi/pcf) |
| 436 (lbs) | 0.135 (in) | 13.300% | 72.305 (psi) | 18.294 (psi/pcf) |
| 437 (lbs) | 0.145 (in) | 14.286% | 72.471 (psi) | 18.336 (psi/pcf) |
| 438 (lbs) | 0.155 (in) | 15.271% | 72.637 (psi) | 18.378 (psi/pcf) |
| 439 (lbs) | 0.165 (in) | 16.256% | 72.803 (psi) | 18.420 (psi/pcf) |
| 441 (lbs) | 0.175 (in) | 17.241% | 73.134 (psi) | 18.503 (psi/pcf) |

TABLE C2-continued

"Cellular Structure" Foam Core-Sample II

| Load (lbs) | True Deformation (in) | Strain % | Stress (psi) | Specific Stress (psi/pcf) |
|---|---|---|---|---|
| 442 (lbs) | 0.185 (in) | 18.227% | 73.300 (psi) | 18.545 (psi/pcf) |
| 444 (lbs) | 0.195 (in) | 19.212% | 73.632 (psi) | 18.629 (psi/pcf) |

TABLE C3

"Cellular Structure" Foam Core-Sample III

| Load (lbs) | True Deformation (in) | Strain % | Stress (psi) | Specific Stress (psi/pcf) |
|---|---|---|---|---|
| 16 (lbs) | 0.003 (in) | 0.296% | 2.657 (psi) | 0.680 (psi/pcf) |
| 69 (lbs) | 0.013 (in) | 1.283% | 11.459 (psi) | 2.931 (psi/pcf) |
| 148 (lbs) | 0.023 (in) | 2.270% | 24.579 (psi) | 6.287 (psi/pcf) |
| 236 (lbs) | 0.033 (in) | 3.258% | 39.193 (psi) | 10.025 (psi/pcf) |
| 313 (lbs) | 0.043 (in) | 4.245% | 51.981 (psi) | 13.295 (psi/pcf) |
| 373 (lbs) | 0.053 (in) | 5.232% | 61.945 (psi) | 15.844 (psi/pcf) |
| 406 (lbs) | 0.063 (in) | 6.219% | 67.426 (psi) | 17.246 (psi/pcf) |
| 417 (lbs) | 0.073 (in) | 7.206% | 69.252 (psi) | 17.713 (psi/pcf) |
| 422 (lbs) | 0.083 (in) | 8.193% | 70.083 (psi) | 17.925 (psi/pcf) |
| 422 (lbs) | 0.093 (in) | 9.181% | 70.083 (psi) | 17.925 (psi/pcf) |
| 421 (lbs) | 0.103 (in) | 10.168% | 69.917 (psi) | 17.883 (psi/pcf) |
| 421 (lbs) | 0.113 (in) | 11.155% | 69.917 (psi) | 17.883 (psi/pcf) |
| 422 (lbs) | 0.123 (in) | 12.142% | 70.083 (psi) | 17.925 (psi/pcf) |
| 422 (lbs) | 0.133 (in) | 13.129% | 70.083 (psi) | 17.925 (psi/pcf) |
| 423 (lbs) | 0.143 (in) | 14.116% | 70.249 (psi) | 17.968 (psi/pcf) |
| 424 (lbs) | 0.153 (in) | 15.104% | 70.415 (psi) | 18.010 (psi/pcf) |
| 426 (lbs) | 0.163 (in) | 16.091% | 70.747 (psi) | 18.095 (psi/pcf) |
| 427 (lbs) | 0.173 (in) | 17.078% | 70.913 (psi) | 18.138 (psi/pcf) |
| 428 (lbs) | 0.183 (in) | 18.065% | 71.079 (psi) | 18.180 (psi/pcf) |
| 430 (lbs) | 0.193 (in) | 19.052% | 71.411 (psi) | 18.265 (psi/pcf) |

Figure 11:
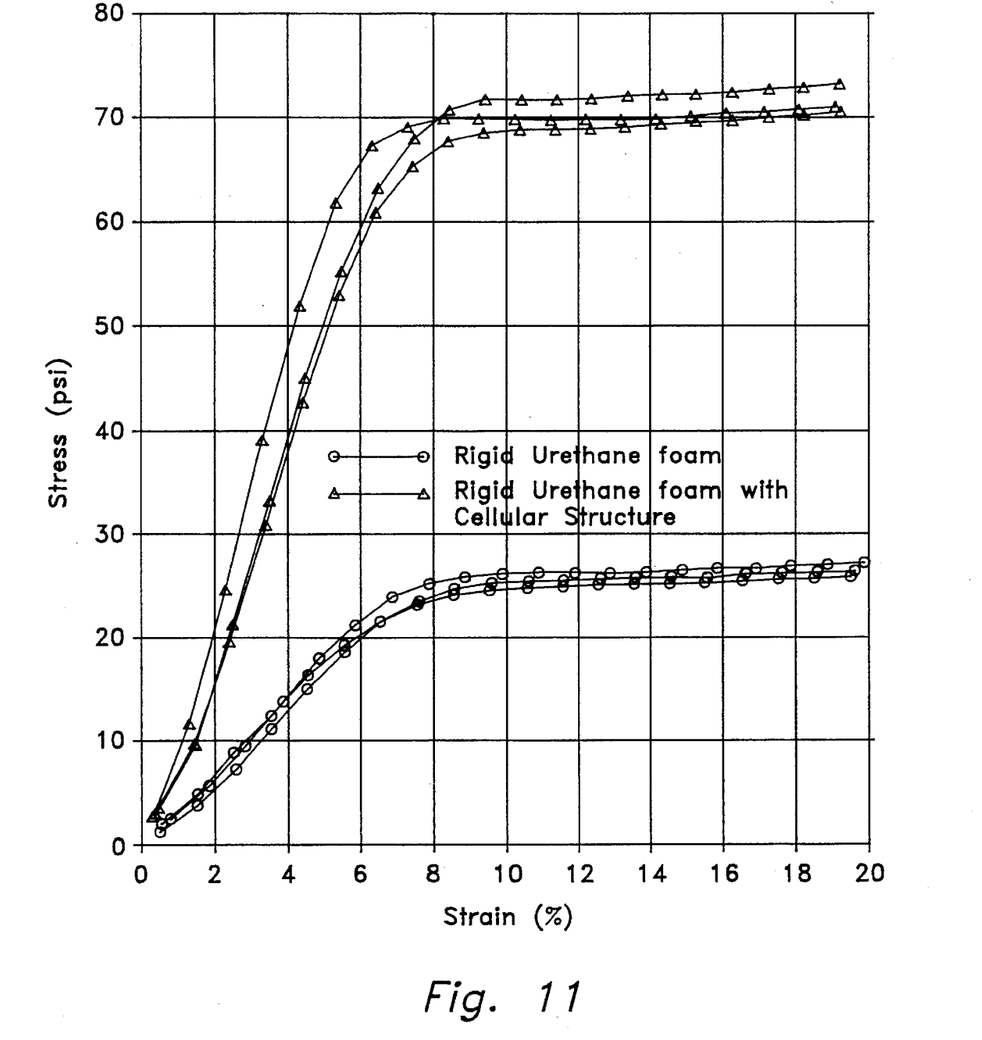
FIG. 11 is a graph of stress against increasing strain of three samples of a "standard" foam board with plots indicated by open circles and three samples of the "cellular" foam board of the invention with plots indicated by open triangles.
Figure 12:
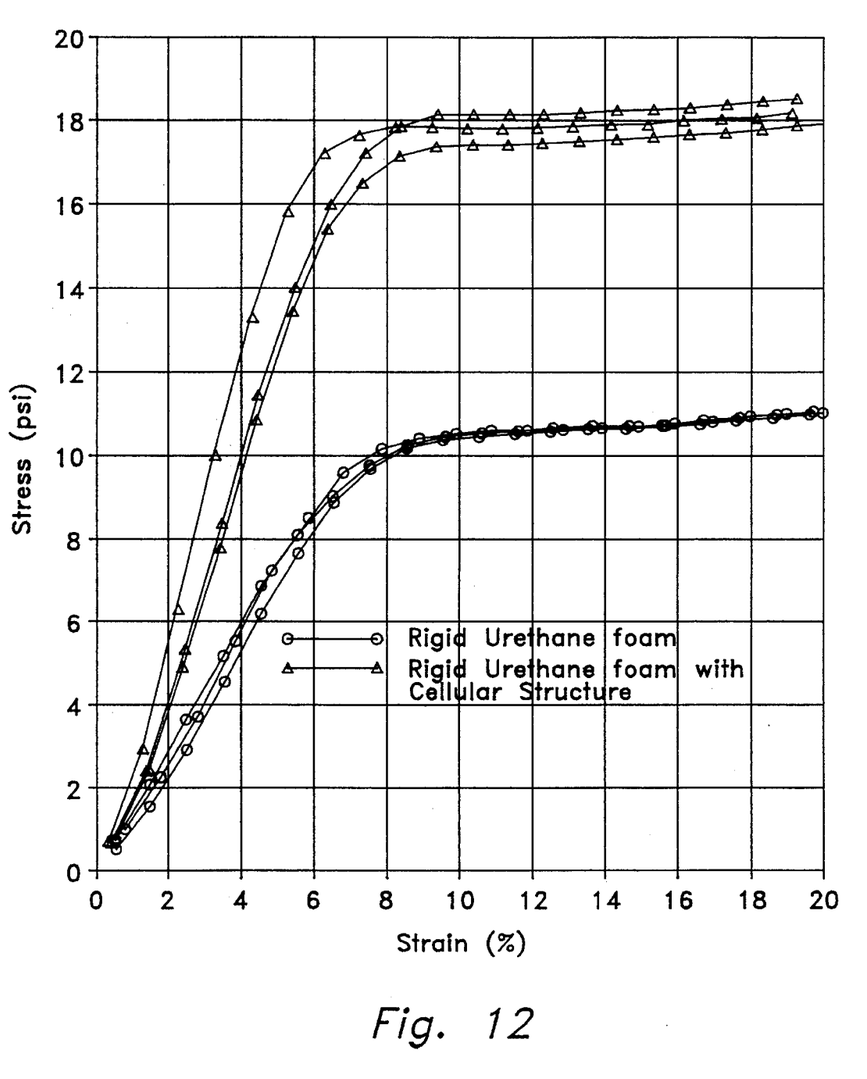
FIG. 12 is a graph of specific stress against increasing strain of the three samples of the "standard" foam board with plots indicated by open circles and the three samples of the "cellular" foam board of the invention with plots indicated by open triangles.

FIGS. 11 and 12 graphically represent the data collected in Tables B1–B3 and C1–C3 and illustrate the different results when applying the same test to "standard" and "cellular structure" foams. In FIGS. 11 and 12, the three samples of "standard" foam are plotted with open circles and the three samples of "cellular" foam are plotted with open triangles. In FIG. 11, measured stress is graphed against measured strain and shows that approximately 2.7 (270%) times the stress applied to "cellular structure" foam is needed to produce essentially the same strain (% deformation) of "standard" foam. These results clearly show the increased strength and specific strength for the products of the present invention, when compared with "standard" foam.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A method of producing a plastic foam composition of matter comprising the steps of:

(a) preparing a first liquid plastic mixture that is capable of foaming to produce a first plastic foam composition of matter;

(b) depositing on a generally planar surface said first liquid plastic mixture of step (a) in a form of a first row having essentially an arcuate top;

(c) curing said first row of said first liquid plastic mixture of step (b) to produce a first row of foamed plastic having a first arcuate shell;

(d) preparing a second liquid plastic mixture that is capable of foaming to produce a second plastic foam composition of matter;

(e) depositing on said generally planar surface said second liquid plastic mixture of step (d) in a form of a second row juxtaposed to and in contact with said first arcuate shell of step (c);

(f) curing said second row of said second liquid plastic mixture of step (e) to produce a second row of foamed plastic that is bound to said first row of step (c) and comprises a second arcuate shell that terminates in said first arcuate shell to form a first trough between said first arcuate shell and said second arcuate shell;

(g) preparing a third liquid plastic mixture that is capable of foaming to produce a third plastic foam composition of matter;

(h) depositing in said trough of step (f) said third liquid plastic mixture of step (g) in a form of a third row in contact with said first arcuate shell of step (c) and said second arcuate shell of step (f);

(i) curing said third liquid plastic mixture of step (h) to produce a third row of foamed plastic that is bound to said first row of step (c) and to said second row of step (f) and comprises a third arcuate shell, and to further produce a plastic foam composition of matter comprising said second arcuate shell terminating in said first arcuate shell and said third arcuate shell terminating in said second arcuate shell and such that a vertical sectional view through said plastic foam composition of matter defines each of the first, second, and third arcuate shell as being convex.

2. The method of claim 1 wherein said first plastic mixture, said second plastic mixture, and said third plastic comprises essentially the same chemical composition.

3. The method of claim 2 wherein said chemical composition is a two-part urethane foam system.

4. The method of claim 3 wherein said planar surface comprises a polyethylene surface.

5. The method of claim 1 additionally comprising providing a mold for producing a honeycomb shape, said mold comprising a first planar face, a second planar face, and a third planar face, said first, second, and third planar faces having respective first, second, and third polyethylene surfaces thereof, and said first face, said second face, and said third face comprising a vertical cross section defining one half of a honeycomb structure.

6. The method of claim 5 additionally comprising disposing said mold of claim 5 on said first row of step (b) prior to said curing step (c) and removing said mold prior to said preparing step (d); disposing said mold of claim 5 on said second row of step (e) prior to said curing step (f) and removing said mold prior to said preparing step (g); and disposing said mold of claim 5 on said third row of step (h) prior to said curing step (i) and removing said mold after said curing step (i).

7. A method of producing a plastic foam composition of matter comprising the steps of:

(a) providing an acidic mixture that is capable of foaming a plastic resin/plastic foaming agent/catalyst;

(b) providing a plastic resin/plastic foaming agent/catalyst which is capable of being foamed by said acidic mixture;

(c) mixing a first portion of said acidic mixture with a first portion of said plastic resin/plastic foaming agent/catalyst to produce a first mixture;

(d) pouring said first mixture of step (c) in a form of a first row on a generally planar surface;

(e) curing said first row of step (d) to produce a first row of foamed plastic having a first shell thereof;

(f) mixing a second portion of said acidic mixture with a second portion of said plastic resin/plastic foaming agent/catalyst to produce a second mixture;

(g) pouring said second mixture of step (f) in a form of a second row on said generally planar surface juxtaposed to and in contact with said first shell of step (e);

(h) curing said second row of step (g) to produce a second row of foamed plastic having a second shell thereof that is bound to the first row of step (e) and comprises said second shell thereof terminating is said first shell to form a first trough between said first shell and said second shell;

(i) mixing a third portion of said acidic mixture with a third portion of said plastic resin/plastic foaming agent/catalyst to produce a third mixture;

(j) pouring said third mixture of step (i) in a form of a third row in said first trough of step (h) so as to be in contact with said first shell of step (e) and said second shell of step (h);

(k) curing said third row of step (j) to produce a third row of foamed plastic having a third shell thereof, said third shell being bound to said first row and to said second row, having said second shell terminating in said first shell and said third shell terminating in said second shell, and such that a vertical sectional view through said plastic foam composition of matter defines each of the first, second, and third shells as being convex.

8. The method of claim 7 additionally comprising repeating said method for producing a plastic composition of matter comprised of a plurality of first, second, and third rows.

9. The method of claim 7 additionally comprising providing a mold for producing a honeycomb shape, said mold comprising a first planar face, a second planar face, and a third planar face, and said first face, said second face, and said third face comprising a vertical cross section defining one half of a honeycomb structure.

10. The method of claim 9 additionally comprising disposing said mold of claim 9 on said first row of step (d) prior to said curing step (e) and removing said mold prior to said mixing step (f); disposing said mold of claim 9 on said second row of step (g) prior to said curing step (h) and removing said mold prior to said mixing step (i); and disposing said mold of claim 9 on said third row of step (j) prior to said curing step (k) and removing said mold after said curing step (k).

11. A method for producing a generally pyramidally shaped plastic composition of matter comprising the steps of:

(a) mixing a acidic mixture with a plastic resin/plastic foaming agent/catalyst to produce a foaming mixture;

(b) depositing a row of the foaming mixture on a generally planar surface;

(c) curing the row to produce a row of foamed plastic having a shell;

(d) repeating steps (a)–(c) for depositing a row contiguous to the row of step (c) such that a trough is formed therebetween;

(e) repeating steps (a)–(d) for depositing a plurality of generally parallel contiguous rows until a desired number of rows is deposited such that any two contiguous rows defines a trough therebetween; and (f) repeating steps (a)–(d) to deposit rows in the troughs defined between any two contiguous rows to form a pyramidally shaped composition of matter generally comprising layers of contiguous rows disposed in troughs between underlying layers of contiguous rows.

* * * * *